(12) United States Patent
Shoda

(10) Patent No.: US 11,754,833 B2
(45) Date of Patent: Sep. 12, 2023

(54) IMAGE PROCESSING APPARATUS AND CONTROL METHOD FOR IMAGE PROCESSING APPARATUS

(71) Applicant: CANON KABUSHIKI KAISHA, Tokyo (JP)

(72) Inventor: Satoshi Shoda, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/703,814

(22) Filed: Mar. 24, 2022

(65) Prior Publication Data

US 2022/0317442 A1 Oct. 6, 2022

(30) Foreign Application Priority Data

Mar. 30, 2021 (JP) ................................. 2021-058480

(51) Int. Cl.
*G02B 27/00* (2006.01)
*G06T 19/00* (2011.01)
*G02B 27/01* (2006.01)

(52) U.S. Cl.
CPC ..... *G02B 27/0075* (2013.01); *G02B 27/0101* (2013.01); *G06T 19/006* (2013.01); *G02B 2027/014* (2013.01); *G02B 2027/0138* (2013.01)

(58) Field of Classification Search
CPC ............ G02B 27/0075; G02B 27/0101; G02B 2027/0138; G02B 2027/014; G02B 27/01; G02B 2027/0127; G02B 2027/0185; G06T 19/006
See application file for complete search history.

(56) References Cited

U.S. PATENT DOCUMENTS

2013/0308038 A1* 11/2013 Miyajima ................ G03B 3/10
348/345
2018/0149826 A1* 5/2018 Lei ............................ G02B 7/28
2018/0176452 A1* 6/2018 Nikkanen ............ H04N 17/002

FOREIGN PATENT DOCUMENTS

JP 6685814 B2 4/2020

* cited by examiner

*Primary Examiner* — Jeffery A Brier
(74) *Attorney, Agent, or Firm* — Canon U.S.A., Inc. IP Division

(57) ABSTRACT

An image processing apparatus includes one or more processors, and a memory storing instructions which, when the instructions are executed by the one or more processors, cause the image processing apparatus to function as an acquisition unit configured to acquire image signals from an image capturing element in which a plurality of pixels that receive rays of light having passed through different pupil areas of an image forming optical system is arrayed, a combining unit configured to, based on the image signals acquired by the acquisition unit, combine virtual objects with the respective image signals corresponding to the different pupil areas to generate a pair of mixed reality images, and a focus adjustment unit configured to adjust a lens position of the image forming optical system based on an image defocus amount between the pair of mixed reality images.

7 Claims, 12 Drawing Sheets

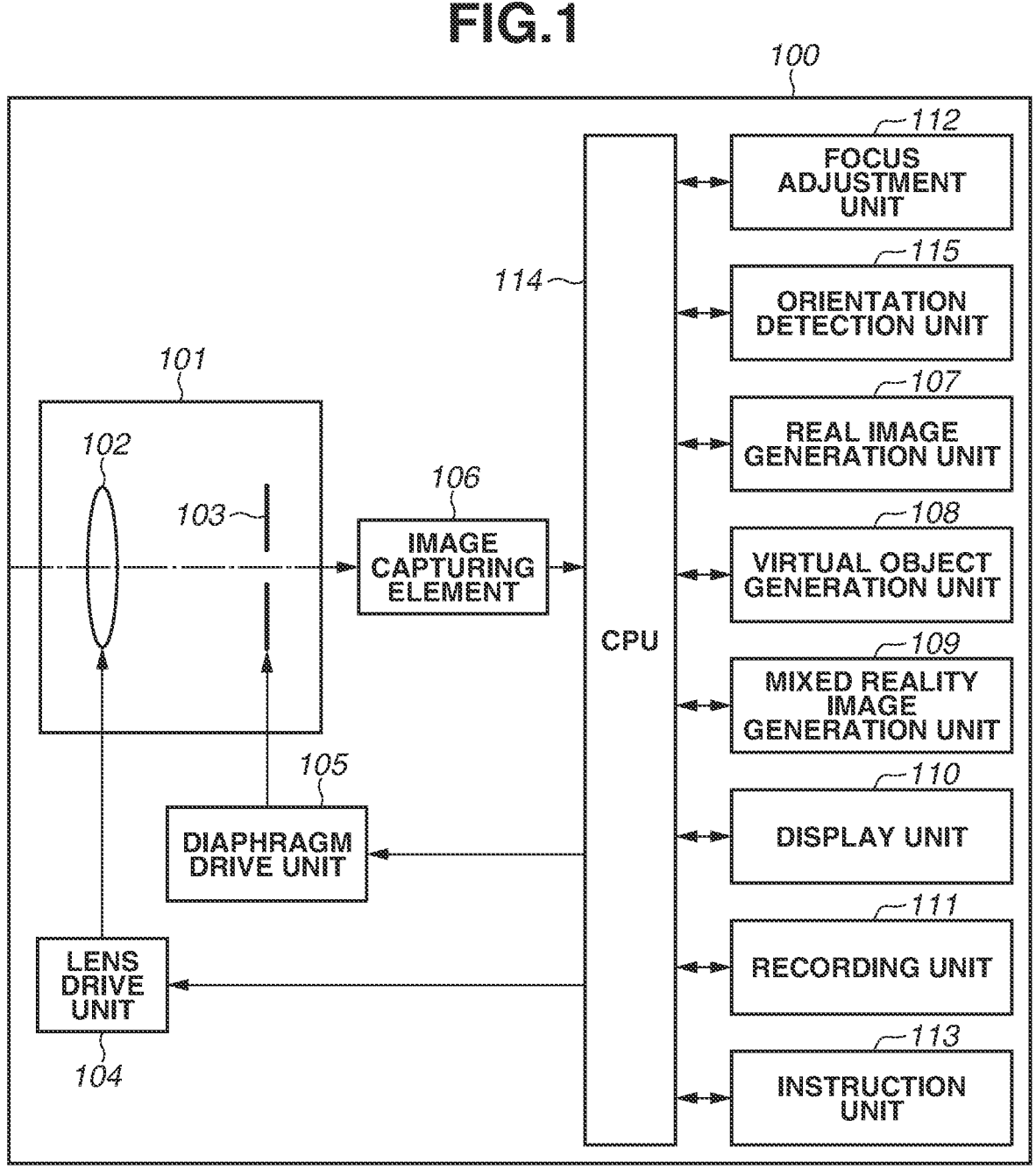

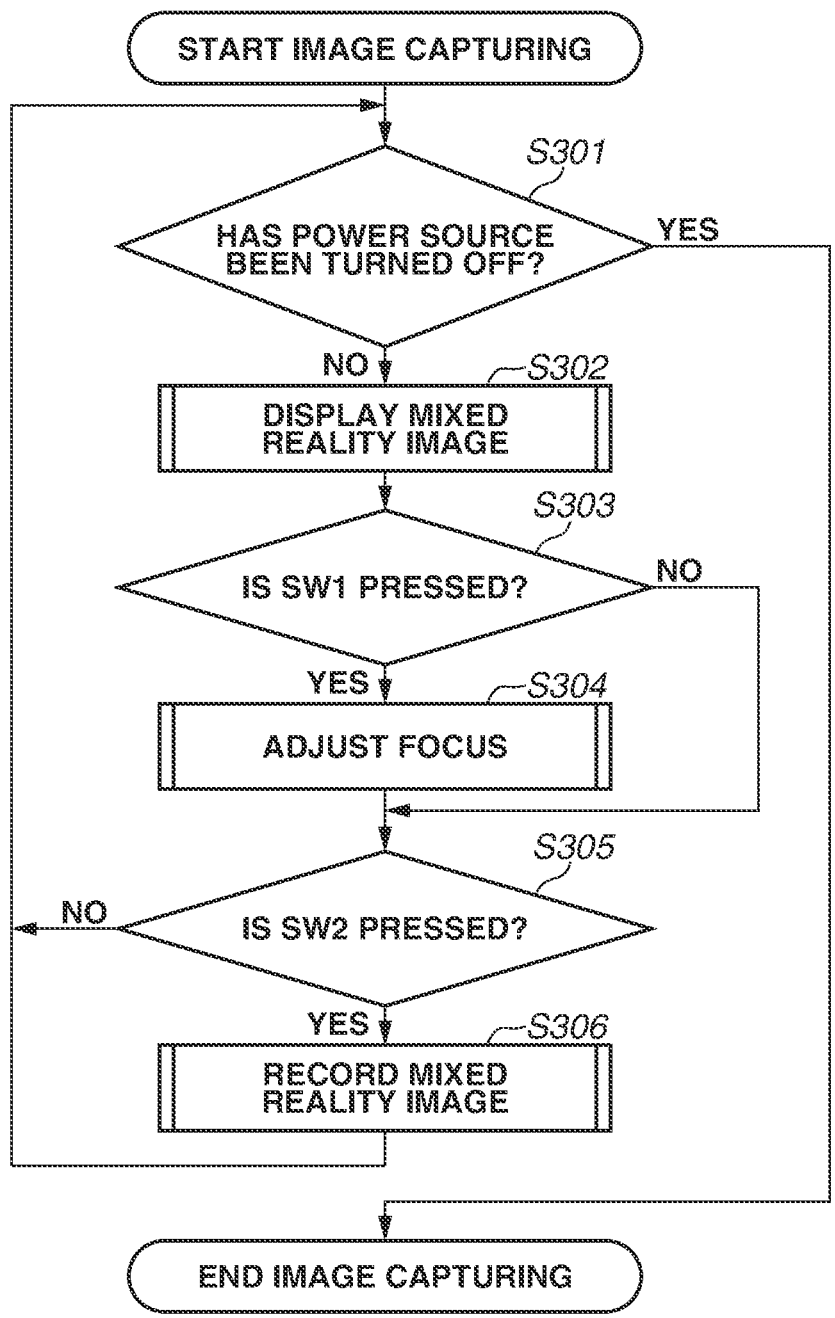

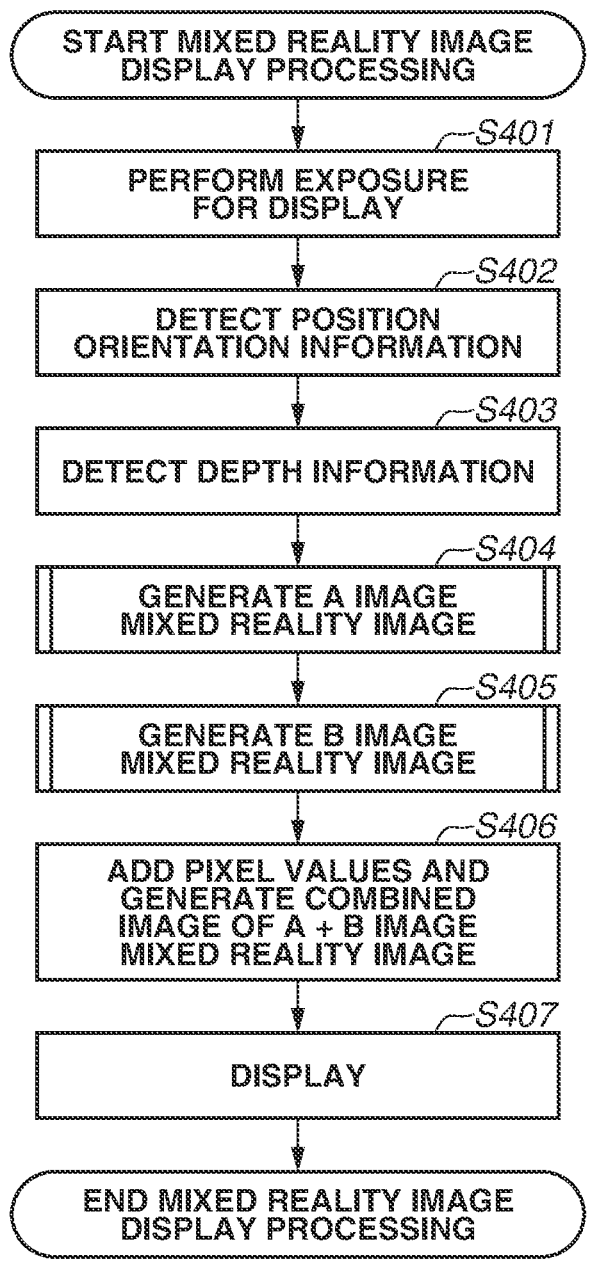

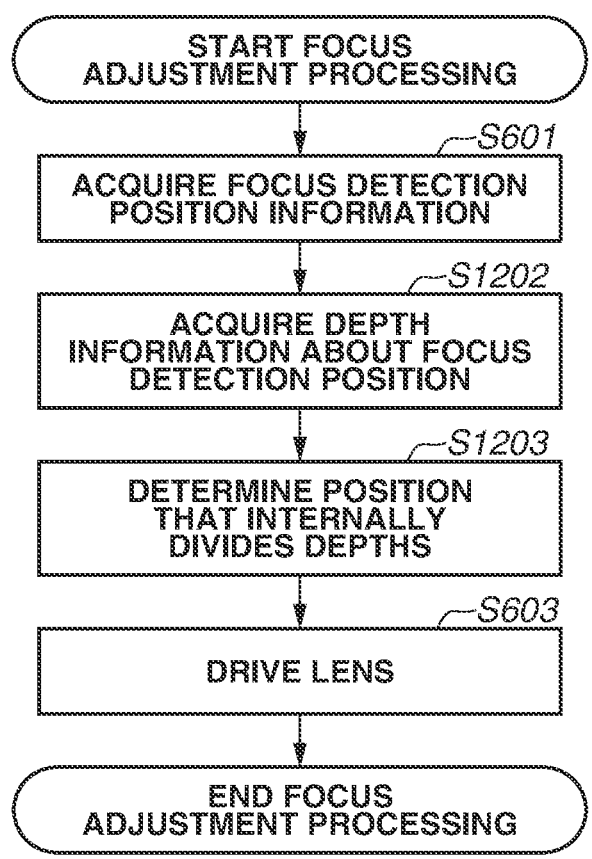

IMAGE PROCESSING APPARATUS AND CONTROL METHOD FOR IMAGE PROCESSING APPARATUS

BACKGROUND

Field of the Invention

The present invention relates to an image processing apparatus, and more particularly to an image processing apparatus capable of capturing an image of mixed reality space.

Description of the Related Art

In recent years, a technique for combining a virtual object with real space and capturing and displaying an image of the virtual object combined with the real space has been known. Such technique is called augmented reality (AR) or mixed reality (MR), and is applied to various uses including industrial uses and entertainment uses.

Japanese Patent No. 6685814 discusses an image capturing apparatus that generates real coordinates indicating an image capturing space the image of which is being captured through a lens and a space outside the image capturing space, and processes a combining target based on a combining position in the real coordinates. Thus, the image capturing apparatus can appropriately combine a virtual object outside an angle of view of the image capturing apparatus.

In mixed reality space including such a real space and a virtual space, a real object and a virtual object coexist.

SUMMARY

The present invention is directed to an image processing apparatus that can appropriately adjust focus in image capturing of mixed reality space.

According to an aspect of the present invention, an image processing apparatus includes one or more processors, and a memory storing instructions which, when the instructions are executed by the one or more processors, cause the image processing apparatus to function as an acquisition unit configured to acquire image signals from an image capturing element in which a plurality of pixels that receive rays of light having passed through different pupil areas of an image forming optical system is arrayed, a combining unit configured to, based on the image signals acquired by the acquisition unit, combine virtual objects with the respective image signals corresponding to the different pupil areas to generate a pair of mixed reality images, and a focus adjustment unit configured to adjust a lens position of the image forming optical system based on an image defocus amount between the pair of mixed reality images.

Further features of the present invention will become apparent from the following description of exemplary embodiments with reference to the attached drawings.

BRIEF DESCRIPTION OF THE DRAWINGS

FIG. 1 is a block diagram illustrating an image capturing apparatus according to one or more aspects of the presently disclosure.

FIG. 3 is a flowchart illustrating an operation for capturing an image of mixed reality space according to one or more aspects of the presently disclosure.

FIG. 4 is a flowchart illustrating mixed reality image display processing according to one or more aspects of the presently disclosure.

FIG. 12 is a flowchart illustrating focus adjustment processing according to one or more aspects of the presently disclosure.

DESCRIPTION OF THE EMBODIMENTS

Figure 2A:
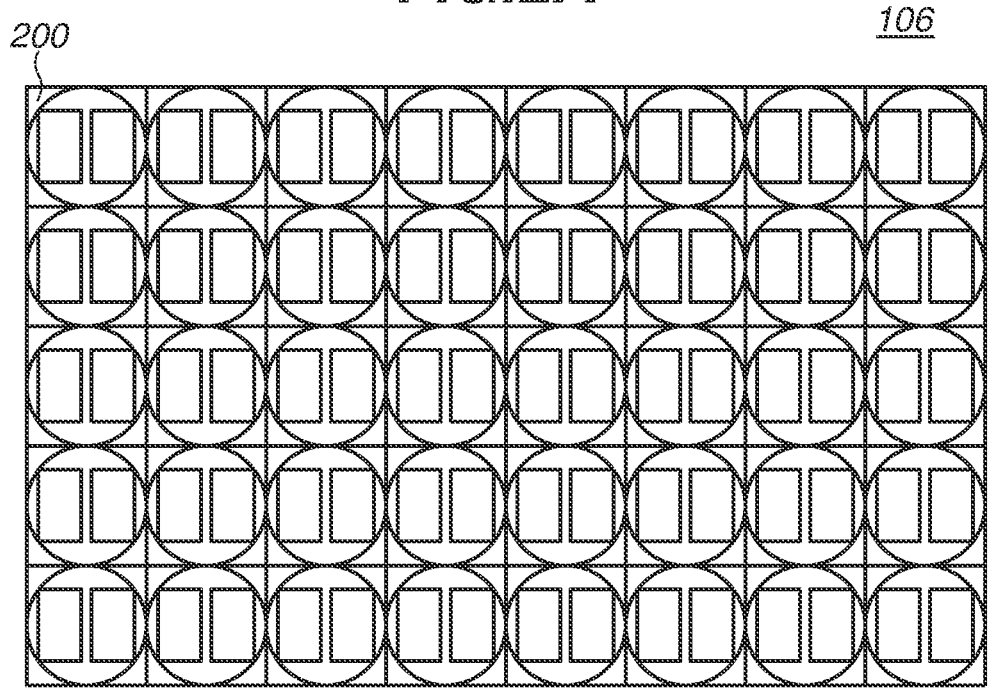
FIGS. 2A and 2B are diagrams each illustrating an image capturing element according to one or more aspects of the presently disclosure.

Hereinafter, exemplary embodiments of the present invention are described with reference to the drawings.

A first exemplary embodiment is described using a case in which an image capturing apparatus including a range finding unit adjusts focus at the time of image capturing of mixed reality space. The range finding unit uses what is called an imaging plane phase difference system in which a pixel having a phase difference detection function is arranged in an image capturing element.

FIG. 1 is a block diagram illustrating a configuration of an image capturing apparatus 100 according to the present exemplary embodiment.

An image forming optical system 101 guides light from an object to an image capturing element 106. The image forming optical system 101 includes a focusing lens 102, a diaphragm 103, and a lens group (not illustrated). The focusing lens 102 is driven in an optical axis direction based on a drive control instruction from a lens drive unit 104. The diaphragm 103 is driven by a diaphragm drive unit 105 to have a certain aperture diameter to adjust a quantity of light. The image capturing element 106 is a pixel array in which unit pixels described below are two-dimensionally arrayed. The image capturing element 106 photoelectrically converts received light flux, and outputs a pair of signals having parallax. In the present exemplary embodiment, the image capturing element 106 converts an analog signal to be output from a photoelectric conversion unit 203 into a digital signal via an analog-to-digital (A/D) converter, and outputs the digital signal. However, the present exemplary embodiment is not limited thereto. The image capturing element 106 may output an analog signal as is, and an A/D converter different from the image capturing element 106 may be separately disposed.

More specifically, an A image signal and a B image signal to be output from the image capturing element 106 can be an analog signal or a digital signal.

Herein, the image capturing element 106 is described in detail with reference to FIGS. 2A and 2B. FIG. 2A is a diagram illustrating one portion of the image capturing element 106 as seen from the top. As illustrated in FIG. 2A, the image capturing element 106 includes a plurality of unit pixels 200 that are two-dimensionally arrayed.

Figure 2B:
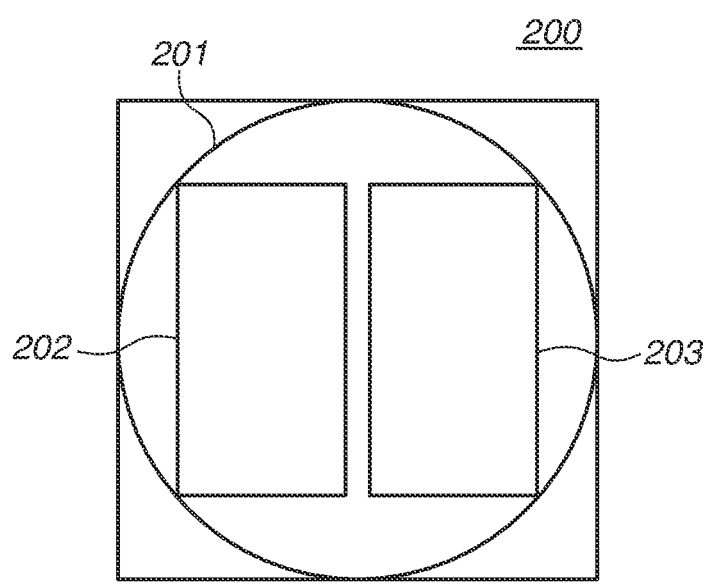

Each unit pixel 200, as illustrated in FIG. 2B, includes two photoelectric conversion units 202 and 203 with respect to a micro lens 201. The photoelectric conversion units 202 and 203 are designed to receive respective rays of light flux that have passed different pupil areas of the image forming optical system 101, and a pair of signals acquired by the photoelectric conversion units 202 and 203 has parallax. A phase difference between the pair of signals is detected, so that focus can be detected and a distance can be measured. Hereinafter, a signal that can be acquired by the photoelectric conversion unit 202 is referred to as the A image signal, and a signal that can be acquired by the photoelectric conversion unit 203 is referred to as the B image signal.

In the present exemplary embodiment, the unit pixel 200 is configured to output the A image signal and the B image signal that can be acquired by the pair of respective photoelectric conversion units 202 and 203. However, the configuration is not limited thereto. Signals (electric charges) that can be acquired by the photoelectric conversion units 202 and 203 may be mixed by floating diffusion, and the mixed signals may be output as an A+B image.

A pair of signal groups (A image signals, B image signals) output from the image capturing element 106 is stored in a storage area provided in a central processing unit (CPU) 114 that comprehensively controls the image capturing apparatus 100. Such a pair of signal groups stored in the storage area is transferred to each processing unit via the CPU 114.

A real image generation unit 107 performs development processing including defective pixel correction processing and color conversion processing on an A image signal and a B image signal (a pair of image signals) output from the image capturing element 106 to generate a pair of real space images.

A virtual object generation unit 108 generates a pair of virtual objects models that are to be combined with a pair of real space images, respectively. The virtual object model generation processing will be described in detail below.

A mixed reality image generation unit 109 overlays and combines a real space image and a virtual object model to generate a mixed reality image. The mixed reality image generation unit 109 generates an A image mixed reality image in which a real image corresponding to an A image signal and a virtual object model are combined, and a B image mixed reality image in which a real image corresponding to a B image signal and a virtual object model are combined. Moreover, the mixed reality image generation unit 109 may generate an A+B image mixed reality image in which the A image mixed reality image and the B image mixed reality image are added and combined.

A display unit 110 is a display device including a display such as a liquid crystal display. The display unit 110 displays, for example, a live view display, a setting screen for image capturing, and a playback image. In the image capturing apparatus 100, any of mixed reality images to be generated by the mixed reality image generation unit 109 is displayed at the time of live view display.

A recording unit 111 is a recording medium such as a secure digital (SD) card, and records a generated A+B image mixed reality image.

A focus adjustment unit 112 calculates a defocus amount for each area inside an angle of view based on a phase difference between the A image mixed reality image and the B image mixed reality image.

The calculated defocus amount serves as depth information for autofocus or combining of mixed reality images.

An instruction unit 113 is a physical switch included in a body of the image capturing apparatus 100. The instruction unit 113 is used to change an image capturing mode, to designate a focus detection position at the time of autofocus, and to issue an instruction such as an autofocus operation instruction and an exposure start instruction for main image capturing. The instruction unit 113 may be a touch panel built into the display unit 110.

The CPU 114 comprehensively controls operations of the image capturing apparatus 100.

The CPU 114 controls procedures for overall image capturing that will be described below and issues instructions to the lens drive unit 104 and the diaphragm drive unit 105.

An orientation detection unit 115 includes a gyro sensor and a gravitational acceleration sensor and outputs position orientation information about the image capturing apparatus 100.

Next, an operation for capturing an image of mixed reality space by the image capturing apparatus 100 is described.

FIG. 3 is a flowchart illustrating an operation for capturing an image of mixed reality space by the image capturing apparatus 100 based on control performed by the CPU 114. An operation of each step is performed by the CPU 114 or each processing unit based on an instruction from the CPU 114.

If image capturing is started, the processing proceeds to step S301. In step S301, the CPU 114 determines whether a power source has been turned off.

If the CPU 114 determines that the power source has not been turned off (NO in step S301), the processing proceeds to step S302. If the CPU 114 determines that the power source has been turned off (YES in step S301), the image capturing processing ends.

In step S302, the CPU 114 performs live view display processing on a mixed reality image.

The mixed reality image display processing will be described in detail below.

In step S303, the CPU 114 determines whether a switch SW1 of the instruction unit 113 is pressed. If the CPU 114 determines that the switch SW1 is pressed (YES in step S303), the processing proceeds to step S304. In step S304, the CPU 114 performs focus adjustment processing, and the processing proceeds to step S305. If the CPU 114 determines that the switch SW1 is not pressed (NO in step S303), the processing proceeds to step S305 without the focus adjustment processing.

The focus adjustment processing will be described in detail below. Alternatively, even if the switch SW1 is not pressed, the focus adjustment processing in step S304 may always be performed.

In step S305, the CPU 114 determines whether a switch SW2 of the instruction unit 113 is pressed. If the CPU 114 determines that the switch SW2 is pressed (YES in step S305), the processing proceeds to step S306. In step S306, the CPU 114 performs mixed reality image recording processing. If the CPU 114 determines that the switch SW2 is not pressed (NO in step S305), the processing returns to step S301, and a series of operations is repeated.

The mixed reality image recording processing will be described in detail below. After execution of the mixed reality image recording processing in step S306, the processing returns to step S301, and a series of operations is repeated.

Then, the mixed reality image display processing is described in detail with reference to FIG. 4. FIG. 4 is a flowchart illustrating the mixed reality image display processing. An operation of each step is performed by the CPU 114 or each processing unit based on an instruction from the CPU 114.

In step S401, the CPU 114 causes exposure to be performed at a cycle corresponding to a display rate, and sequentially acquires A image signals and B image signals that are generated upon image capturing by the image capturing element 106. Subsequently, in step S402, the orientation detection unit 115 detects position orientation information. The detected position orientation information is stored in association with the A image signal and the B image signal acquired in step S401 by the CPU 114. In step S403, the CPU 114 detects depth information about a space inside an angle of view. The depth information can be obtained by dividing an area inside the angle of view and then detecting a phase difference between the A image signal and the B image signal for each divided area. The detected depth information is stored in association with the A image signal and the B image signal acquired in step S401 by the CPU 114. Subsequently, in step S404, the CPU 114 generates a mixed reality image corresponding to the A image signal (an A image mixed reality image is generated). In step S405, the CPU 114 generates a mixed reality image corresponding to the B image signal (a B image mixed reality image is generated).

Figure 5:
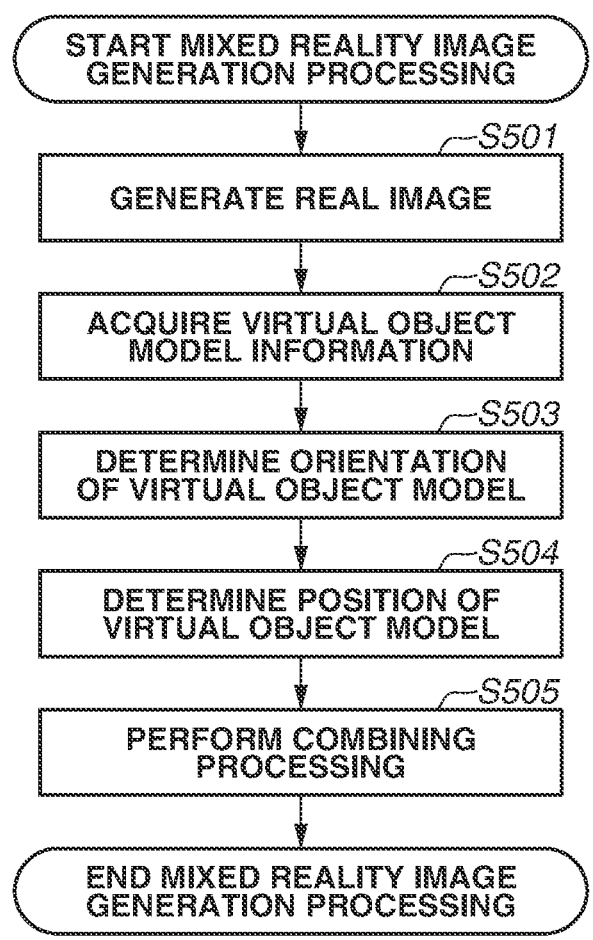
FIG. 5 is a flowchart illustrating mixed reality image generation processing according to one or more aspects of the presently disclosure.

Herein, the mixed reality image generation processing is described in detail with reference to FIG. 5. FIG. 5 is a flowchart illustrating the mixed reality image generation processing. An operation of each step is performed by the CPU 114 or each processing unit based on an instruction from the CPU 114.

In step S501, the CPU 114 performs development by various image processing with respect to a predetermined image signal that has been input. In step S502, the CPU 114 acquires virtual object model information to be arranged in a real image.

For example, if a method for arranging a maker for arrangement of a three-dimensional (3D) model in a real space is employed, the CPU 114 acquires virtual object model information based on marker detection information inside an angle of view.

Subsequently, in step S503, the CPU 114 uses orientation information about the image capturing apparatus 100 to determine a shape of the virtual object model as seen from the image capturing apparatus 100, i.e., an orientation of the virtual object model. The orientation information about the image capturing apparatus 100 is detected and stored beforehand in association with image signals. In step S504, the CPU 114 determines a size of the virtual object model as seen from the image capturing apparatus 100 based on depth information about a position in which the virtual object model is to be arranged. Lastly, in step S505, the CPU 114 projects the virtual object model as seen from the image capturing apparatus 100 on the real image and performs combining processing, so that a mixed reality image is generated.

If the A image mixed reality image and the B image mixed reality image are generated in steps S404 and S405, respectively, the processing proceeds to step S406. In step S406, the CPU 114 adds pixel values at the same coordinates of the A image mixed reality image and the B image mixed reality image. Moreover, the CPU 114 generates a combined image of the A image and the B image (an A+B image mixed reality image is generated), and the processing proceeds to step S407. In step S407, the CPU 114 shapes the A+B image mixed reality image to a size appropriate for display and displays the size-adjusted A+B image mixed reality image on the display unit 110 in a live view manner. Accordingly, in a position and/or a size corresponding to a position and orientation of the image capturing apparatus 100, virtual objects are combined with the A image signals and the B image signals sequentially acquired by the image capturing element 106 to generate mixed reality images. The generated mixed reality images are sequentially displayed on the display unit 110, so that a live view display of the mixed reality images can be provided.

Then, the focus adjustment processing is described in detail with reference to FIG. 6.

Figure 6:
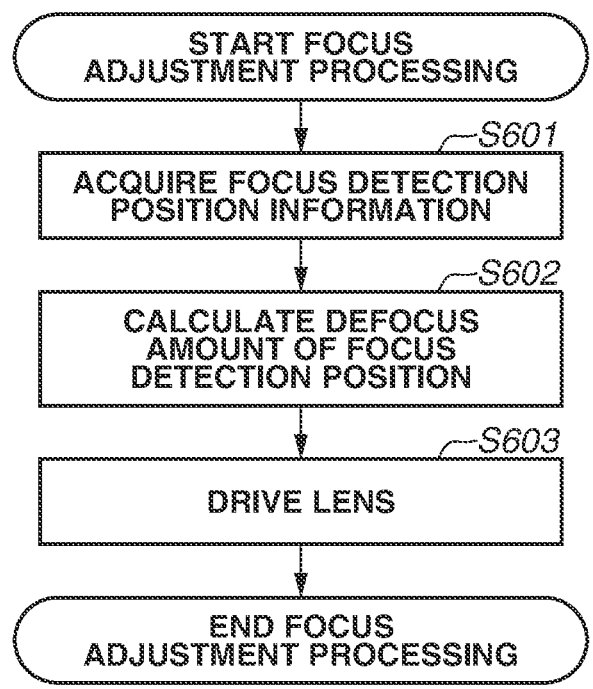
FIG. 6 is a flowchart illustrating focus adjustment processing according to one or more aspects of the presently disclosure.

FIG. 6 is a flowchart illustrating the focus adjustment processing. An operation of each step is performed by the CPU 114 or each processing unit based on an instruction from the CPU 114.

If the focus adjustment processing is started, the processing proceeds to step S601. In step S601, the CPU 114 acquires focus detection position information indicating an object area to be in focus. The focus detection position information may be determined based on an operation performed by a user on the instruction unit 113, or may be position information about an area corresponding to an object that is determined as a main object based on image analysis. Subsequently, in step S602, the CPU 114 calculates a defocus amount at focus detection positions of the A image mixed reality image and the B image mixed reality image. Herein, in the present exemplary embodiment, correlation calculation and defocus amount calculation are performed using a mixed reality image with which a virtual object has been combined, instead of using images represented by an A image signal and a B image signal output from the image capturing element 106. Accordingly, distance information (a defocus amount) that matches a mixed reality image after arrangement of a virtual object can be acquired.

An example of a method for detecting a defocus amount of an image signal includes a method using a correlation calculation method called a sum of absolute difference (SAD) method.

A sum of absolute differences between image signals in each shift position is determined while shifting a relative positional relation between an A image and a B image, and a shift position in which the sum of absolute differences is smallest is detected. Such detection of the shift position enables detection of a defocus amount.

In step S603, the CPU 114 uses a predetermined coefficient for conversion of the calculated defocus amount into a lens drive amount to calculate a lens drive amount, and issues a drive instruction to the lens drive unit 104. The lens drive unit 104 moves the focusing lens 102 based on the lens drive amount, and the focus adjustment processing ends.

Figure 7:
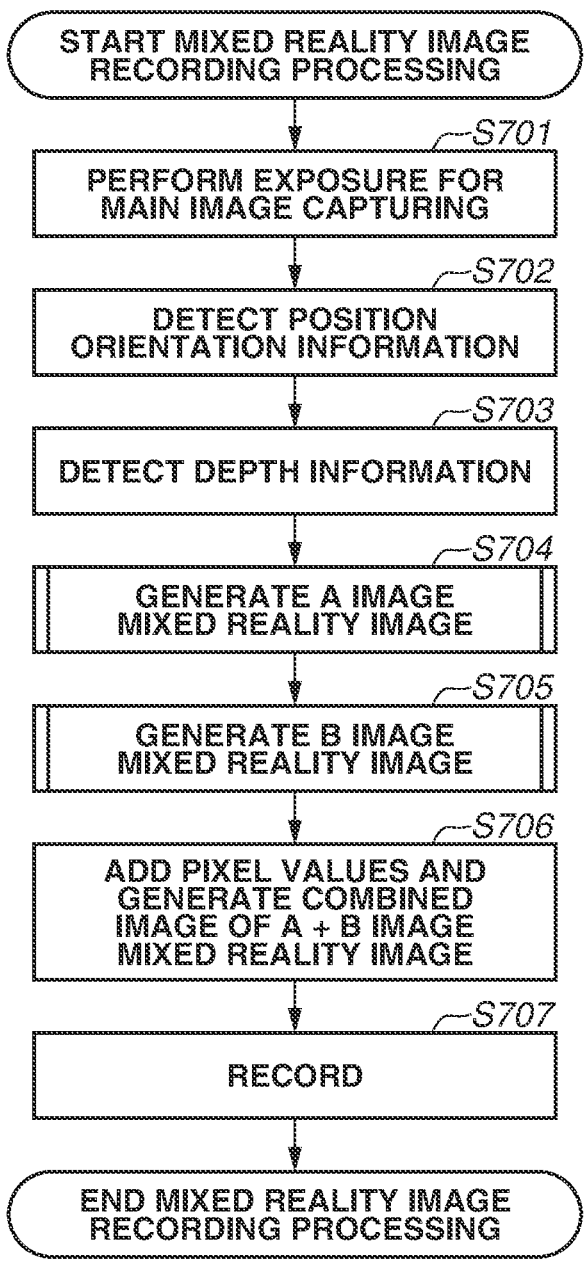
FIG. 7 is a flowchart illustrating mixed reality image recording processing according to the first exemplary embodiment.

Then, the mixed reality image recording processing is described with reference to FIG. 7. FIG. 7 is a flowchart illustrating the mixed reality image recording processing. An operation of each step is performed by the CPU 114 or each processing unit based on an instruction from the CPU 114.

In step S701, the CPU 114 performs exposure at a shutter speed or an aperture value that is set beforehand as an image capturing parameter, and acquires an A image signal and a B image signal to be generated by the image capturing element 106. The processing from step S702 to step S706 is similar to the processing from step S402 to step S406 illustrated in FIG. 4 except for data to be input. In FIG. 4, data to be input in step S401 is an image which is captured under an exposure condition for display. In FIG. 7, data to be input in step S701 is an image which is captured under an exposure (recording) condition for main image capturing.

Thus, for example, the number of pixels or bits to be input may be different.

In step S707, the CPU 114 writes the A+B image mixed reality image generated in step S706 in the recording unit 111, and the mixed reality image recording processing ends.

Therefore, the image capturing apparatus 100 according to the first exemplary embodiment generates a mixed reality image corresponding to each of a pair of image signals that have passed different pupil areas of the image forming optical system 101, and adjusts focus by using the mixed reality image. Accordingly, even if a virtual object exists, an appropriate defocus amount can be acquired.

The first exemplary embodiment has been described using a configuration in which focus is adjusted with respect to a single object.

A second exemplary embodiment is described using a configuration in which focus is adjusted with respect to a plurality of objects in different depth directions by an image capturing apparatus capable of designating a plurality of focus detection positions.

Figure 8:
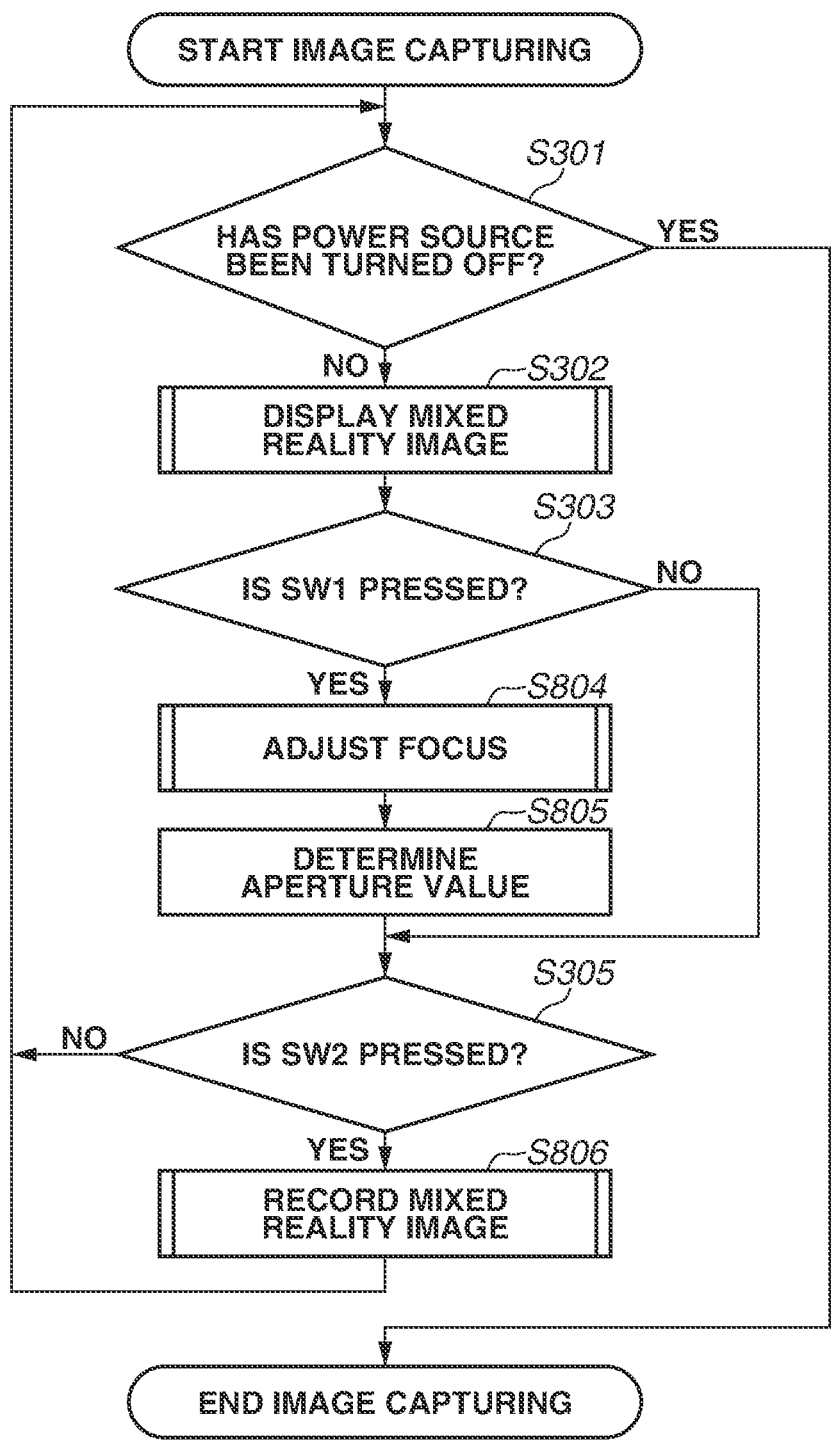
FIG. 8 is a flowchart illustrating an operation for capturing an image of mixed reality space according to one or more aspects of the presently disclosure.

FIG. 8 is a flowchart of an image capturing procedure performed by an image capturing apparatus 100 according to the second exemplary embodiment. The image capturing apparatus 100 adjusts focus to a plurality of objects in different depth directions through focus adjustment processing in step S804 and aperture value determination processing in step 805.

Herein, the focus adjustment processing in step S804 according to the second exemplary embodiment is described. An operation of each step is performed by a CPU 114 or each processing unit based on an instruction from the CPU 114.

Figure 9:
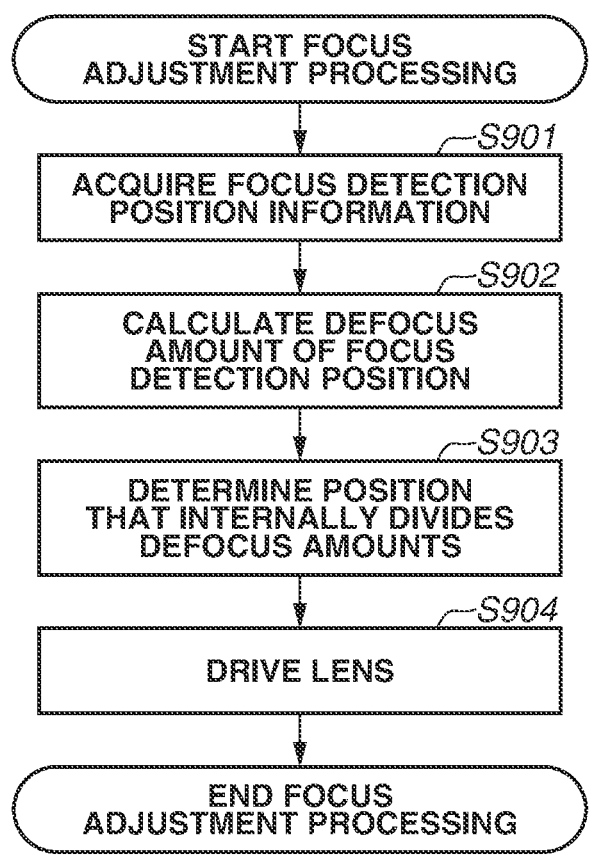
FIG. 9 is a flowchart illustrating focus adjustment processing according to one or more aspects of the presently disclosure.

FIG. 9 is a flowchart illustrating the focus adjustment processing. If the focus adjustment processing is started, the processing proceeds to step S901. In step S901, the CPU 114 acquires focus detection position information. In the present exemplary embodiment, two or more pieces of area information are included.

Subsequently, in step S902, the CPU 114 calculates a defocus amount with respect to each of the plurality of focus detection positions. In step S903, the CPU 114 determines a position that internally divides a plurality of defocus amounts. Specifically, the CPU 114 detects a minimum value and a maximum value of the plurality of defocus amounts, and obtains a lens position that internally divides the minimum value and the maximum value. Herein, the internally divided defocus amount is stored in a storage unit of the CPU 114. The defocus amount stored in the storage unit is referred to in aperture value determination processing that will be described below.

Subsequently, in step S904, the CPU 114 drives the lens to the position which internally divides the plurality of defocus amounts, and the focus adjustment processing ends.

After the focus adjustment processing in step S804, the aperture value determination processing is executed in step S805. Specifically, the CPU 114 divides the internally divided defocus amount determined in step S903 by a permissible confusion circle diameter to calculate an aperture value at the time of image capturing.

If a switch SW2 is pressed (YES in step S305), the CPU 114 generates a mixed reality image based on signals acquired by exposure using the aperture value determined in step S805. Then, in step S806, the CPU 114 writes the mixed reality image in the recording unit 111.

Therefore, the mixed reality image is used to calculate defocus amounts corresponding to the plurality of focus detection positions, and a lens is driven to a position that internally divides the plurality of defocus amounts. In addition, in the position to which the lens has been driven, an image is captured with an aperture value such that images of a plurality of objects fits in a permissible confusion circle. Such image capturing enables focus to be adjusted to all of the objects corresponding to the plurality of focus detection positions.

Each of the first and second exemplary embodiments has been described using a method by which focus detection employing a phase difference method is performed on a pair of mixed reality images to calculate a defocus amount. A third exemplary embodiment is described using a method by which depth information on a depth at which a virtual object is arranged at the time of generation of a mixed reality image is updated, and focus is adjusted to a plurality of objects based on the updated depth information.

Hereinafter, components and configurations that have been already described are given the same reference numerals as above, and descriptions of such components and configurations are omitted. Meanwhile, components and configurations that are different from those in the first or second exemplary embodiment are described.

Figure 10:
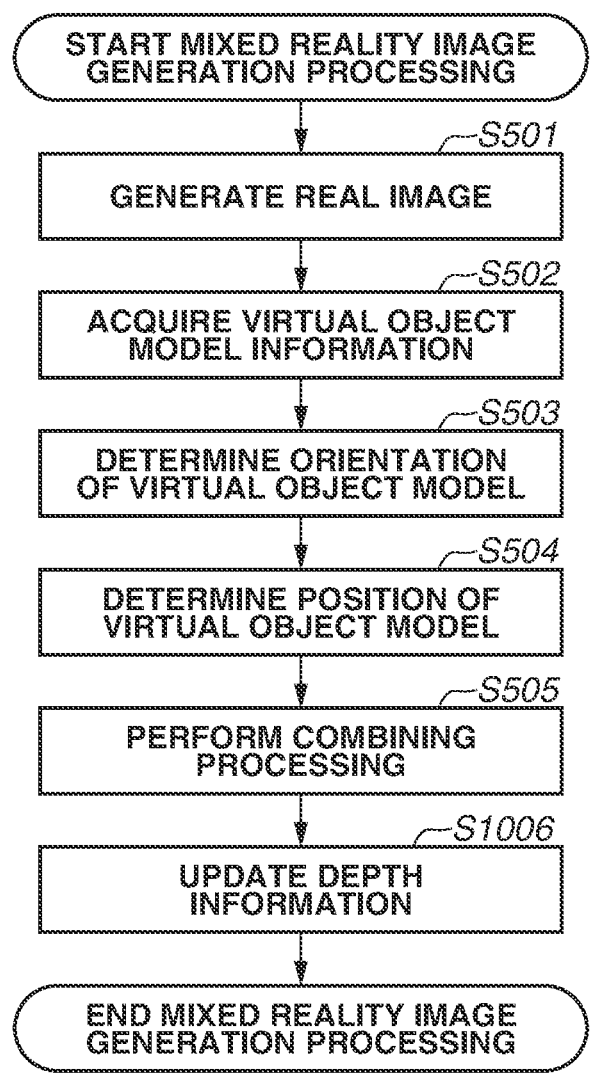
FIG. 10 is a flowchart illustrating mixed reality image generation processing according to one or more aspects of the presently disclosure.

FIG. 10 is a flowchart illustrating mixed reality image generation processing according to the third exemplary embodiment.

After a series of processes from step S501 to step S505 is performed on a real image to generate a mixed reality image, the processing proceeds to step S1006. In step S1006, depth information update processing is performed.

More specifically, depth information about an area in which a virtual object is arranged is updated to depth information after arrangement of the virtual object. The depth information is desirably updated in consideration of a depth of a virtual object with respect to an arrangement position of the virtual object.

Figure 11:
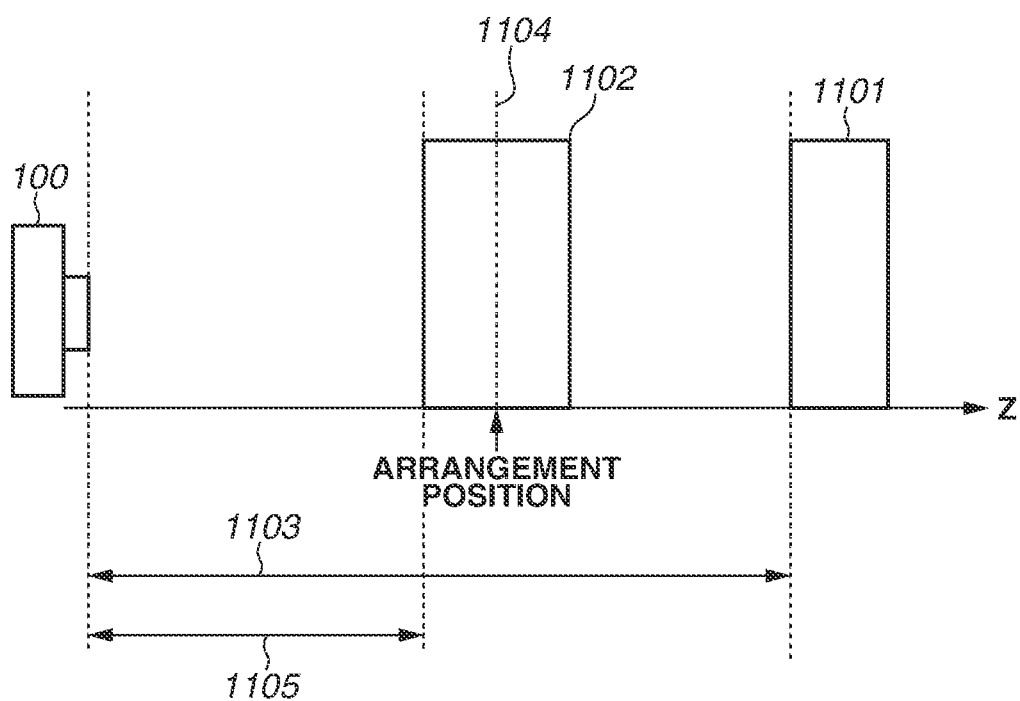
FIG. 11 is a diagram illustrating depth information according to one or more aspects of the presently disclosure.

FIG. 11 is a diagram illustrating an update of the depth information.

The diagram illustrated in FIG. 11 includes an object 1101 in a real space (also referred to as a real object 1101), and an object 1102 in a virtual space (also referred to as a virtual object 1102). The virtual object 1102 is arranged closer (to the image capturing apparatus 100) than the real object 1101.

First, in step S403, the CPU 114 detects depth information 1103 corresponding to the real object 1101. Next, in step S503, the CPU 114 determines an arrangement position 1104 of the virtual object 1102. The arrangement position 1104 is, for example, a barycentric coordinate position of a marker. In step S505, the CPU 114 makes an arrangement such that a center-of-gravity position of the virtual object 1102 coincides with the arrangement position 1104. Subsequently, in step S1006, the CPU 114 determines depth information 1105 in view of depth information about the virtual object 1102, and updates the depth information 1103 with the new depth information 1105.

Then, focus adjustment processing according to the third exemplary embodiment is described.

FIG. 12 is a flowchart illustrating the focus adjustment processing according to the third exemplary embodiment.

After the CPU 114 acquires a plurality of pieces of focus detection position information in step S601, the processing proceeds to step S1202. In step S1202, the CPU 114 acquires depth information about a focus detection position. The depth information to be acquired herein is the depth information updated in step S1006 illustrated in FIG. 9. Thus, the virtual object is reflected in the depth information.

Subsequently, in step S1203, the CPU 114 detects the nearest depth information and the farthest depth information from among pieces of depth information corresponding to the plurality of focus detection positions, and determines a lens drive position such that the nearest depth information and the farthest depth information are internally divided.

Accordingly, the use of the depth information after arrangement of a virtual object enables a lens drive position to be determined without correlation calculation.

Herein, the example in which the depth information about the real space is acquired using the image capturing apparatus with the image capturing element including the divided pixels has been illustrated for the sake of description. However, the method for acquiring the depth information about the real space is not limited thereto. For example, the depth information about the real space may be acquired by a distance measurement sensor employing a time of flight (TOF) method. In such a case, an image capturing element does not necessarily include the divided pixels.

After the focus adjustment processing, the processing proceeds to aperture value determination processing for image capturing as in step S805 illustrated in FIG. 8, and the CPU determines an aperture value at the time of image capturing.

In the third exemplary embodiment, as described above, the lens drive position and the aperture value are determined based on the depth information in which the virtual object is reflected.

Therefore, in each of the exemplary embodiments, focus can be appropriately adjusted to a desired object in image capturing of mixed reality space.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2021-058480, filed Mar. 30, 2021, which is hereby incorporated by reference herein in its entirety.

What is claimed is:

1. An image processing apparatus comprising:
one or more processors; and
a memory storing instructions which, when the instructions are executed by the one or more processors, cause the image processing apparatus to function as:
an acquisition unit configured to acquire image signals from an image capturing element in which a plurality of pixels that receive rays of light having passed through different pupil areas of an image forming optical system is arrayed;
a combining unit configured to, based on the image signals acquired by the acquisition unit, combine virtual objects with the respective image signals corresponding to the different pupil areas to generate a pair of mixed reality images; and
a focus adjustment unit configured to adjust a lens position of the image forming optical system based on an image defocus amount between the pair of mixed reality images.

2. An image processing apparatus comprising:
an acquisition unit configured to acquire a real space image via an image forming optical system;
a combining unit configured to combine a virtual object with the real space image to generate a mixed reality image;
a focus adjustment unit configured to adjust a lens position of the image forming optical system based on a plurality of pieces of depth information in the mixed reality image; and
an aperture adjustment unit configured to adjust an aperture value at a time of image capturing based on the plurality of pieces of depth information in the mixed reality image.

3. The image processing apparatus according to claim 2, wherein the real space image is captured by an image capturing element in which a plurality of pixels that receive rays of light having passed through different pupil areas of the image forming optical system is arrayed.

4. The image processing apparatus according to claim 3, wherein the depth information is an image defocus amount between a pair of mixed reality images that are acquired by combining virtual objects with respective image signals corresponding to the different pupil areas.

5. The image processing apparatus according to claim 2, wherein the depth information is information on relative distance between the image processing apparatus and an object.

6. A control method for an image processing apparatus, the control method comprising:
acquiring image signals from an image capturing element in which a plurality of pixels that receive rays of light having passed through different pupil areas of an image forming optical system is arrayed;

combining, based on the image signals acquired by the acquiring, virtual objects with the respective image signals corresponding to the different pupil areas to generate a pair of mixed reality images; and focus-adjusting a lens position of the image forming optical system based on an image defocus amount between the pair of mixed reality images.

7. A control method for an image processing apparatus, the control method comprising:

acquiring a real space image via an image forming optical system;

combining a virtual object with the real space image to generate a mixed reality image;

focus-adjusting a lens position of the image forming optical system based on a plurality of pieces of depth information in the mixed reality image; and aperture-adjusting an aperture value at a time of image capturing based on the plurality of pieces of depth information in the mixed reality image.

* * * * *